US012563135B2

(12) United States Patent
Lan

(10) Patent No.: US 12,563,135 B2
(45) Date of Patent: Feb. 24, 2026

(54) WIRELESS TERMINAL

(71) Applicant: Huawei Technologies Co., Ltd., Shenzhen (CN)

(72) Inventor: Yao Lan, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 446 days.

(21) Appl. No.: 18/007,100

(22) PCT Filed: Jul. 20, 2021

(86) PCT No.: PCT/CN2021/107389
§ 371 (c)(1),
(2) Date: Jan. 27, 2023

(87) PCT Pub. No.: WO2022/022333
PCT Pub. Date: Feb. 3, 2022

(65) Prior Publication Data
US 2023/0275984 A1      Aug. 31, 2023

(30) Foreign Application Priority Data
Jul. 29, 2020      (CN) .......................... 202010747370.7

(51) Int. Cl.
*H04M 1/02*      (2006.01)
*H04B 1/3827*      (2015.01)

(52) U.S. Cl.
CPC ........ *H04M 1/0277* (2013.01); *H04B 1/3838* (2013.01)

(58) Field of Classification Search
CPC ... H04M 1/0277; H04B 1/3838; H04B 1/385; H04B 1/40; H04B 1/38; H04B 1/3888; H01Q 1/273; H01Q 1/245; H01Q 1/48; H01Q 21/245; H01Q 1/2291; H01Q 1/38; H01Q 15/14; H01Q 19/10; H04L 69/18
See application file for complete search history.

(56) References Cited

U.S. PATENT DOCUMENTS 3,281,848 A * 10/1966 Ames ........................ H01P 1/22
                                                                                 455/24
3,383,692 A * 5/1968 Laibson ............... H01Q 1/1264
                                                                                 343/915

(Continued)

FOREIGN PATENT DOCUMENTS

CN          103367891 A      10/2013
CN          114095050 B      12/2022

*Primary Examiner* — Jinsong Hu
*Assistant Examiner* — Rui M Hu
(74) *Attorney, Agent, or Firm* — Conley Rose, P.C.

(57) ABSTRACT

A wireless terminal includes a housing, an antenna, a circuit board, and a loss reduction structure. The housing has a first side plate. The circuit board is arranged proximate to and facing the first side plate, and the circuit board is a ground end of the antenna. The loss reduction structure is made with a metal material. The loss reduction structure includes a connection stub, a first stub, and a second stub. The connection stub is electrically coupled to the circuit board. The first stub and the second stub are located on two sides of the connection stub, and both are coupled to the connection stub. The first stub and the second stub are proximate to the first side plate and are arranged in a direction parallel to the first side plate.

20 Claims, 9 Drawing Sheets

(56)　　　　　References Cited

U.S. PATENT DOCUMENTS

| | | | | |
|---|---|---|---|---|
| 5,760,745 | A * | 6/1998 | Endo | H01Q 1/243 |
| | | | | 343/702 |
| 5,936,583 | A * | 8/1999 | Sekine | H01Q 1/243 |
| | | | | 343/702 |
| 6,037,840 | A * | 3/2000 | Myer | H01P 5/12 |
| | | | | 330/124 R |
| 6,095,820 | A * | 8/2000 | Luxon | H01Q 9/285 |
| | | | | 343/702 |
| 6,215,454 | B1 * | 4/2001 | Tran | H01Q 1/243 |
| | | | | 343/702 |
| 6,421,016 | B1 * | 7/2002 | Phillips | H01Q 1/48 |
| | | | | 343/702 |
| 6,745,057 | B1 * | 6/2004 | Hankui | H01Q 19/10 |
| | | | | 343/702 |
| 7,126,545 | B2 * | 10/2006 | Nagano | H01Q 1/36 |
| | | | | 343/702 |
| 7,782,257 | B2 * | 8/2010 | Kim | H01Q 9/0421 |
| | | | | 343/831 |
| 8,208,980 | B2 * | 6/2012 | Wong | H01Q 5/371 |
| | | | | 343/702 |
| 8,493,274 | B2 * | 7/2013 | Raura | H01Q 1/44 |
| | | | | 343/702 |
| 8,816,921 | B2 * | 8/2014 | Ayatollahi | H01Q 1/243 |
| | | | | 343/702 |
| 8,928,538 | B2 * | 1/2015 | Montgomery | H01Q 9/26 |
| | | | | 343/702 |
| 9,973,232 | B1 * | 5/2018 | Kuo | H04B 1/50 |
| 10,090,578 | B2 * | 10/2018 | Wolentarski | H01Q 1/245 |
| 10,637,148 | B1 * | 4/2020 | Channabasappa | H01Q 5/40 |
| 11,271,319 | B2 * | 3/2022 | Celik | H01Q 1/38 |
| 2002/0075189 | A1 * | 6/2002 | Carillo, Jr. | H01Q 9/285 |
| | | | | 343/702 |
| 2004/0027304 | A1 * | 2/2004 | Chiang | H01Q 3/446 |
| | | | | 343/810 |
| 2004/0066341 | A1 * | 4/2004 | Ito | H01Q 21/24 |
| | | | | 343/702 |
| 2009/0115670 | A1 * | 5/2009 | Nysen | H01Q 5/364 |
| | | | | 343/702 |
| 2009/0231215 | A1 * | 9/2009 | Taura | H01Q 21/064 |
| | | | | 343/702 |
| 2011/0018779 | A1 * | 1/2011 | Yu | H01Q 19/28 |
| | | | | 343/834 |
| 2011/0025566 | A1 | 2/2011 | Suh et al. | |
| 2011/0163918 | A1 * | 7/2011 | Wu | H01Q 9/0421 |
| | | | | 343/700 MS |
| 2011/0169709 | A1 * | 7/2011 | Cooper | H01Q 1/246 |
| | | | | 343/841 |
| 2011/0312393 | A1 * | 12/2011 | Pulimi | H01Q 1/52 |
| | | | | 455/575.7 |
| 2011/0316750 | A1 * | 12/2011 | Yen | H01Q 1/245 |
| | | | | 343/702 |
| 2012/0098723 | A1 * | 4/2012 | Yamamoto | H01Q 17/00 |
| | | | | 343/781 R |
| 2012/0105295 | A1 * | 5/2012 | Lin | H01Q 9/42 |
| | | | | 333/81 R |
| 2012/0242549 | A1 * | 9/2012 | Wong | H01Q 7/00 |
| | | | | 343/702 |
| 2012/0256804 | A1 | 10/2012 | Ban et al. | |
| 2012/0274523 | A1 * | 11/2012 | Ayatollahi | H01Q 1/243 |
| | | | | 343/834 |
| 2012/0274532 | A1 * | 11/2012 | Kurashima | H01Q 9/145 |
| | | | | 343/848 |
| 2013/0090072 | A1 | 4/2013 | Lim et al. | |
| 2013/0120201 | A1 * | 5/2013 | Park | H01Q 1/48 |
| | | | | 343/749 |
| 2013/0141285 | A1 * | 6/2013 | Chen | H01Q 1/242 |
| | | | | 343/702 |
| 2014/0015735 | A1 * | 1/2014 | Lebrun | H01Q 15/168 |
| | | | | 343/912 |
| 2014/0375426 | A1 * | 12/2014 | Nero, Jr. | H01Q 1/36 |
| | | | | 29/601 |
| 2014/0375520 | A1 * | 12/2014 | Wu | H01Q 1/52 |
| | | | | 343/841 |
| 2015/0042524 | A1 * | 2/2015 | Kerselaers | H01Q 1/273 |
| | | | | 343/718 |
| 2015/0215011 | A1 * | 7/2015 | Hartenstein | H01Q 13/085 |
| | | | | 375/267 |
| 2015/0270614 | A1 * | 9/2015 | Kakuya | H01Q 9/42 |
| | | | | 343/793 |
| 2015/0288074 | A1 * | 10/2015 | Harper | H01Q 9/42 |
| | | | | 343/833 |
| 2015/0380815 | A1 * | 12/2015 | Boutayeb | H01Q 21/20 |
| | | | | 343/777 |
| 2015/0380847 | A1 * | 12/2015 | Sun | H01R 13/6594 |
| | | | | 439/78 |
| 2016/0087667 | A1 * | 3/2016 | Li | H01Q 1/243 |
| | | | | 455/73 |
| 2016/0344240 | A1 * | 11/2016 | Yeh | H02J 50/12 |
| 2017/0133765 | A1 * | 5/2017 | Moldovan | H01Q 9/0485 |
| 2018/0294579 | A1 * | 10/2018 | Shinkawa | H04B 1/3888 |
| 2019/0036564 | A1 * | 1/2019 | Tanenbaum | H04B 1/3838 |
| 2019/0165870 | A1 * | 5/2019 | Uno | H01Q 21/28 |
| 2019/0341675 | A1 * | 11/2019 | Yamagajo | H01Q 1/48 |
| 2019/0363428 | A1 * | 11/2019 | Zhu | H01Q 9/0457 |
| 2019/0379105 | A1 * | 12/2019 | Sayem | H01Q 1/273 |
| 2019/0386402 | A1 * | 12/2019 | Ahn | H01Q 21/30 |
| 2020/0044359 | A1 * | 2/2020 | Gorcea | H01Q 1/364 |
| 2020/0076079 | A1 * | 3/2020 | Shan | H01Q 15/14 |
| 2020/0091590 | A1 * | 3/2020 | Su | H04B 1/3827 |
| 2020/0103833 | A1 * | 4/2020 | Kita | G04R 60/10 |
| 2020/0144714 | A1 * | 5/2020 | Noras | H01Q 1/526 |
| 2020/0212569 | A1 * | 7/2020 | Kumar | H01Q 21/065 |
| 2021/0075085 | A1 * | 3/2021 | Chang | H01Q 21/28 |
| 2021/0159586 | A1 * | 5/2021 | Huang | H01Q 9/06 |
| 2021/0184362 | A1 * | 6/2021 | Hong Loh | H01Q 1/48 |
| 2021/0239847 | A1 * | 8/2021 | Sayem | H01Q 5/35 |
| 2022/0069442 | A1 * | 3/2022 | Kim | H04B 1/40 |
| 2022/0069466 | A1 * | 3/2022 | Chang | H01Q 1/52 |
| 2023/0008642 | A1 * | 1/2023 | Zhang | H01Q 1/2266 |

* cited by examiner

WIRELESS TERMINAL

CROSS-REFERENCE TO RELATED APPLICATIONS

This is a U.S. National Stage of International Patent Application No. PCT/CN2021/107389 filed on Jul. 20, 2021, which claims priority to Chinese Patent Application No. 202010747370.7 filed on Jul. 29, 2020, both of which are hereby incorporated by reference in their entireties.

TECHNICAL FIELD

This application relates to the field of antenna technologies, and in particular, to a wireless terminal.

BACKGROUND

As shown in FIG. 1, a circuit board 03 and one or more antennas 02 are disposed in a housing 01 of a wireless terminal. Other function modules such as a chip, a sensor, and a transceiver module (not shown in the figure) are usually integrated on the circuit board 03. The antenna 02 is connected to the transceiver module on the circuit board 03 by using a feeding structure.

Usually, the circuit board 03 is made of a large-area metal material. Therefore, it is usually considered that the circuit board 03 is a ground end (Ground, GND) of the antenna. When the antenna 02 transmits or receives a signal, a high frequency current flows through the circuit board 03.

During use of the wireless terminal, referring to FIG. 1, a side surface that is of the housing 01 and that is opposite the circuit board 03 may be close to or attached to body skin 04. When a high frequency current flows through the circuit board 03 (a line L1 in FIG. 1 represents the high frequency current on the circuit board 03), an induced current may be generated on a surface of the body skin 04 (a line L2 in FIG. 1 represents the induced current on the body skin 04). Since an electrical conductivity of body skin is very low, a part of an electromagnetic wave radiated by an antenna may be absorbed by the body skin. This leads to the following technical problems: First, radiation efficiency (Total Radiation Power, TRP) of the antenna is reduced. Second, a specific absorption rate (Specific Absorption Rate, SAR) of a human body is relatively high. In this case, much adverse impact is brought to human health, and user experience is affected.

SUMMARY

Embodiments of this application provide a wireless terminal, and a main objective is to provide a wireless terminal that can reduce body skin's absorption of an electromagnetic wave radiated by an antenna, so as to improve radiation efficiency of the antenna and also decrease an SAR.

To achieve the foregoing objective, the following technical solutions are used in embodiments of this application.

This application provides a wireless terminal, including a housing, an antenna, a circuit board, and a loss reduction structure. The housing has a first side plate. Both the antenna and the circuit board are disposed in the housing. The circuit board is arranged close to and face to the first side plate, and the circuit board is a ground end of the antenna. The loss reduction structure is made of a metal material. The loss reduction structure includes a connection stub, a first stub, and a second stub. The connection stub is electrically connected to the circuit board. The first stub and the second stub are located on two sides of the connection stub, and both are connected to the connection stub. The first stub and the second stub are close to the first side plate. The first stub and the second stub are arranged in a direction parallel to the first side plate.

The wireless terminal provided in this application includes the loss reduction structure, and the loss reduction structure is made of a metal material. When the antenna transmits or receives a signal, there is a high frequency current on the circuit board that serves as a ground end of the antenna. The high frequency current flows through the connection stub to the first stub and the second stub. Because the first stub and the second stub are located on the two sides of the connection stub, a current direction on the first stub is opposite to that on the second stub. When the first side plate of the housing is close to or attached to a human body, because the current direction on the first stub is opposite to that on the second stub, induced currents on a body surface of the human body may also have opposite directions correspondingly. In this case, currents in a region that is of the body surface and that is close to the connection stub substantially cancel each other out. Therefore, when the first side plate of the wireless terminal in this application is close to or attached to the body surface, compared with a conventional technology, in this application, the induced current on the body surface is significantly reduced. In this way, absorption of an electromagnetic wave of the antenna by the body surface is reduced, thereby reducing losses, and finally improving radiation efficiency of the antenna. In addition, a specific absorption rate of the human body can be further decreased, to reduce impact on human health, thereby improving user experience of the wireless terminal.

In a possible implementation, the first stub and the second stub are symmetrically arranged with respect to the connection stub. When the first stub and the second stub are symmetrically arranged, a length size of the first stub is equal to that of the second stub. In this way, a magnitude of a current on the first stub is equal to that of a current on the second stub. Correspondingly, a magnitude of an induced current that is formed at a position on the body surface and that corresponds to the first stub is equal to that of an induced current that is formed at a position on the body surface and that corresponds to the second stub. In this case, the currents in the region that is of the body surface and that is close to the connection stub cancel each other out, and approximately completely cancel each other out. In this way, the absorption of the electromagnetic wave of the antenna by the body surface is further reduced, and the radiation efficiency of the antenna is further improved.

In a possible implementation, a sum of a length of the first stub and a length of the second stub is one half of a transmission wavelength of an electromagnetic wave on a frequency band of the antenna. When the sum of the length of the first stub and the length of the second stub is one half of the transmission wavelength of the electromagnetic wave on the frequency band of the antenna, first, the currents in the region that is of the body surface and that is close to the connection stub can be enabled to cancel each other out, and approximately completely cancel each other out, to further improve the radiation efficiency of the antenna; and second, a radiation effect of the antenna can be improved.

In a possible implementation, the first stub and the second stub are located on a wall surface that is of the first side plate and that faces away from the circuit board. The first stub and the second stub are very close to the body surface when the first stub and the second stub are located on the wall surface that is of the first side plate and that faces away from the circuit board, that is, the first stub and the second stub are located on an outer wall surface of the housing, and when the first side plate of the housing is close to or attached to the human body. In this way, the absorption of the electromagnetic wave of the antenna by the body surface is further reduced, thereby improving a loss reduction effect of the loss reduction structure, and further improving the radiation efficiency of the antenna.

In a possible implementation, a metal through hole is disposed on the first side plate, the metal through hole penetrates a first wall surface and a second wall surface, and the metal through hole forms the connection stub. The entire loss reduction structure can be simplified by forming the connection stub by using the metal through hole.

In a possible implementation, a groove is provided on a wall surface that is of the first side plate and that faces the circuit board, and the first stub and the second stub are located in the groove. In other words, the first stub and the second stub are disposed on an inner surface of the housing. In this way, appearance aesthetics of the wireless terminal can be improved. In addition, compared with directly disposing the first stub and the second stub on an inner wall surface of the first side plate, providing a groove on the wall surface that is of the first side plate and that faces the circuit board to dispose the first stub and the second stub in the groove can reduce distances from the first stub and the second stub to the body surface. In this way, the absorption of the electromagnetic wave of the antenna by the body surface is further reduced, and the radiation efficiency of the antenna is further improved. In addition, appearance aesthetics of the wireless terminal can be ensured.

In a possible implementation, there are a plurality of first stubs and a plurality of second stubs, the plurality of first stubs and the plurality of second stubs are in a one-to-one correspondence, and one of the first stub and its corresponding second stub are located on the two sides of the connection stub. During use of the wireless terminal, a contact area between the first side plate and the body surface may be relatively large. Disposing a plurality of first stubs and a plurality of second stubs can avoid a phenomenon that a part of the body surface substantially has no induced current while a part of the body surface has an induced current. Therefore, by disposing a plurality of first stubs and a plurality of second stubs, the radiation efficiency of the antenna of the wireless terminal is further improved.

In a possible implementation, the plurality of first stubs and the plurality of second stubs are connected together, to form a pivotable structure with the connection stub as a center. In terms of a manufacturing process, difficulty in the manufacturing process can be reduced by connecting the plurality of first stubs and the plurality of second stubs, as compared with separating the plurality of first stubs and separating the plurality of second stubs. In terms of a loss reduction effect, a contact area with the body skin may be further increased, so that the radiation efficiency of the antenna of the wireless terminal is further improved.

In a possible implementation, the connection stub is coupled to the circuit board. The electric connection is simple in structure and is convenient for implementation.

In a possible implementation, the connection stub is connected to the circuit board by using a capacitor. The electric connection is simple in structure and is convenient for implementation.

In a possible implementation, the wireless terminal is a wearable device, the wearable device includes a watch body and a watch hand, and the first stub and the second stub are disposed on a bottom cover plate of the watch body. Since the wearable device is often worn on a wrist, impact of the human body on the radiation efficiency of the antenna is relatively large. However, in this application, disposing the loss reduction structure can greatly reduce the induced current on the body surface, thereby improving the radiation efficiency of the antenna, decreasing the specific absorption rate of the human body, and improving user experience.

In a possible implementation, the bottom cover plate is made of a metal material, the bottom cover plate is in a pivotable structure, the bottom cover plate forms the first stub and the second stub, and a position at which the connection stub and the bottom cover plate are connected is located at a center of the bottom cover plate. Compared with disposing the loss reduction structure separately, directly using the bottom cover plate that is of the watch body and that is made of a metal material as the loss reduction structure improves the radiation efficiency of the antenna, and further simplifies an entire structure of the wearable device.

In a possible implementation, the wireless terminal is a mobile phone, a tablet computer, an augmented reality device, or a virtual reality device.

REFERENCE NUMERALS

01: housing; 02: antenna; 03: circuit board; 04: body skin; 1: housing; 101: first side plate; A1: first wall surface; A2: second wall surface; 2: antenna; 3: circuit board; 4: loss reduction structure; 41: connection stub; 42: first stub; 43: second stub; 5: feeding structure; 6: body skin; 7: metal through hole; 8: wearable device; 81: watch body; 82: watch band; 9: mobile phone; 10: groove; 11: simulation block.

DESCRIPTION OF EMBODIMENTS

With diversified functions, an increasing quantity of antennas are disposed in a wireless terminal. During specific use, there may be a use scenario in which the wireless terminal is close to or attached to a human body. Moreover, when the antenna in the wireless terminal is close to the human body, the human body absorbs a part of an electromagnetic wave radiated by the antenna. As a result, radiation efficiency of the antenna is reduced, and user experience is affected.

It should be noted that the wireless terminal in this application may be a mobile phone, a tablet computer, a wearable device, an augmented reality (augmented reality, AR) device, a virtual reality (virtual reality, VR) device, or the like. A specific type of the wireless terminal is not limited in embodiments of this application.

To reduce a human body's absorption of an electromagnetic wave radiated by an antenna, this application provides a wireless terminal. The wireless terminal can reduce a human body's absorption of an electromagnetic wave radiated by an antenna, improve radiation efficiency of the antenna, and decrease a specific absorption rate of the human body, thereby reducing impact on the human body.

Figure 1:
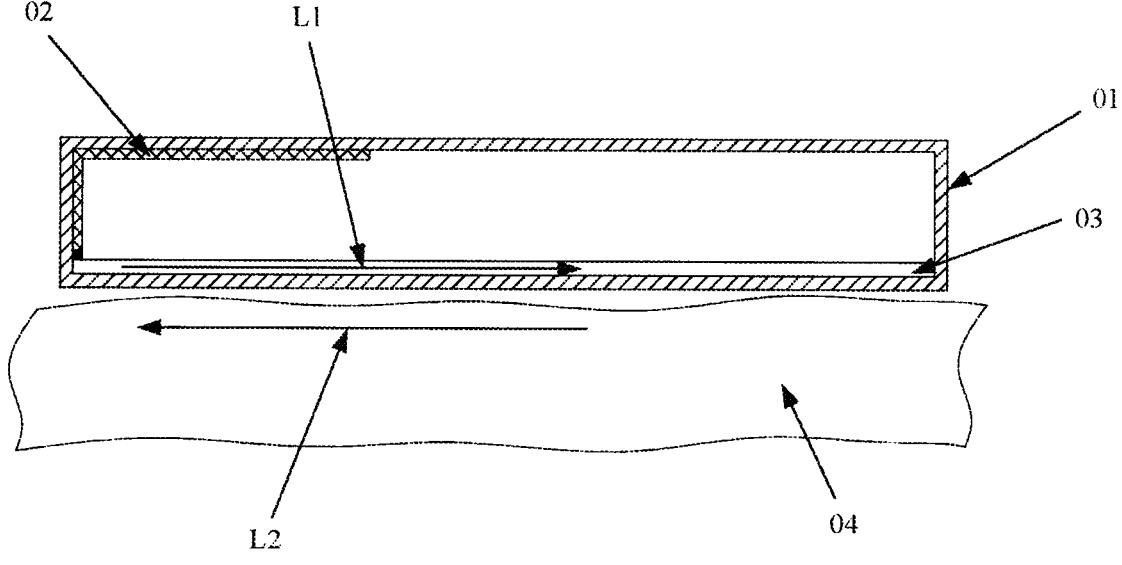
FIG. 1 is a schematic diagram of a structure of a wireless terminal in a conventional technology.
Figure 2:
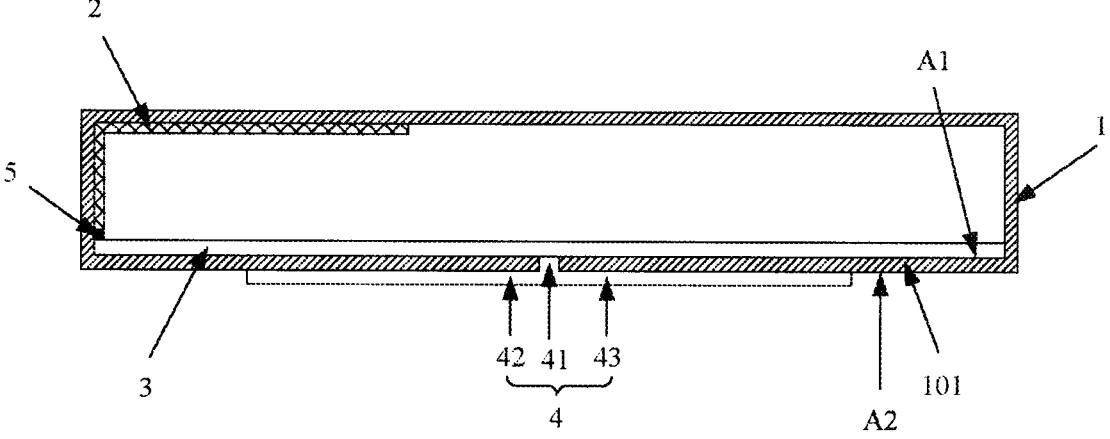
FIG. 2 is a schematic diagram of a structure of a wireless terminal according to an embodiment of this application.

Referring to FIG. 2, the wireless terminal includes a housing 1, an antenna 2 located in the housing 1, a circuit board 3, a transceiver module, and a feeding structure 5.

Usually, the transceiver module is disposed on the circuit board 3, and the antenna 2 is electrically connected to the transceiver module by using the feeding structure 5. In addition, the circuit board 3 is further provided with other function modules of the wireless terminal.

It should be noted that, a position for disposing the antenna 2 is not limited in this application, and includes but is not limited to the disposition position shown in FIG. 2.

Since most of the circuit board 3 is made of a metal material, to simplify a structure in the wireless terminal, the circuit board 3 is used as a ground end of the antenna 2. In this case, when the antenna 2 transmits or receives a signal, a high frequency current flows through the circuit board 3.

Referring to FIG. 2, the housing 1 has a first side plate 101, and the circuit board 3 is arranged close to and face to the first side plate 101.

That the circuit board 3 faces to the first side plate 101 may mean the following: The circuit board 3 may be parallel to the first side plate 101, or the circuit board 3 may be nearly parallel to the first side plate 101.

Referring to FIG. 2, the wireless terminal further includes a loss reduction structure 4 that is made of a metal material. The loss reduction structure 4 includes a connection stub 41, a first stub 42, and a second stub 43.

As shown in FIG. 2, the connection stub 41 is connected to the circuit board 3. The first stub 42 and the second stub 43 are located on two sides of the connection stub 41, and both are connected to the connection stub 41. The first stub 42 and the second stub 43 are close to the first side plate 101. The first stub 42 and the second stub 43 both are arranged in a direction parallel to the first side plate 101.

Since the connection stub 41 is connected to the circuit board 3, when a high frequency current flows through the circuit board 3, the high frequency current on the circuit board 3 flows through the connection stub 41 to the first stub 42 and the second stub 43.

Figure 3:
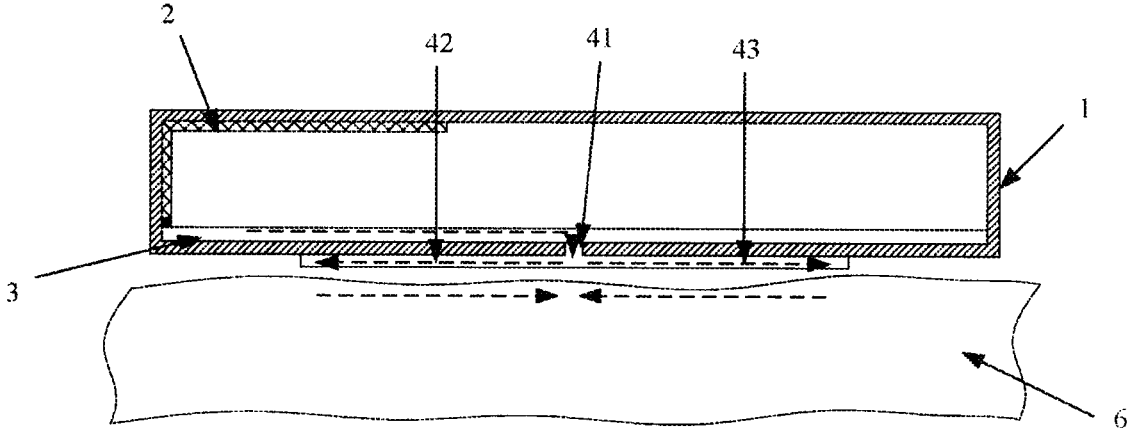
FIG. 3 is a schematic diagram of a structure that reflects a flow direction of a high frequency current on a circuit board and a flow direction of an induced current on a body surface in a case that a wireless terminal is close to body skin according to an embodiment of this application.

During use of the wireless terminal, referring to FIG. 3, the first side plate 101 is close to or attached to body skin 6. For example, when the wireless terminal is a wearable device (a watch or a smart band), the first side plate 101 is a bottom cover plate of a watch body, and the bottom cover plate is attached to body skin. For another example, when the wireless terminal is a mobile phone, the first side plate 101 is a rear cover plate of the mobile phone. When the mobile phone is placed in a pocket, the rear cover plate is attached to body skin.

A loss reduction principle of the loss reduction structure is shown in FIG. 3. A dashed line with an arrow on the circuit board 3 represents the high frequency current on the circuit board 3. A dashed line with an arrow on the first stub 42 represents a current on the first stub 42. A dashed line with an arrow on the second stub 43 represents a current on the second stub 43. Dashed lines with arrows on the body skin 6 represent induced currents on the body skin 6.

Since the first stub 42 and the second stub 43 are located on the two sides of the connection stub 41, it can be seen from FIG. 3 that a current direction on the first stub 42 is opposite to that on the second stub 43. In this case, the induced currents on a surface of the body skin 6 flow toward a region corresponding to the connection stub 41, so that the induced currents in the region that is of the body skin 6 and that corresponds to the connection stub 41 cancel each other out, thereby reducing the induced currents on the body skin 6.

Since the induced currents on the body skin 6 cancel each other out in the region close to the connection stub 41, the induced currents on the body skin are very weak. If no loss reduction structure is disposed, a position that is on the body skin 6 and that corresponds to the connection stub is a strong-current region. However, after the loss reduction structure is disposed, the current in this region becomes very weak. In this way, the absorption of the electromagnetic wave by the human body is significantly reduced, thereby achieving a loss reduction effect. In addition, an SAR can be decreased, thereby avoiding adverse impact on human health.

Figure 4:
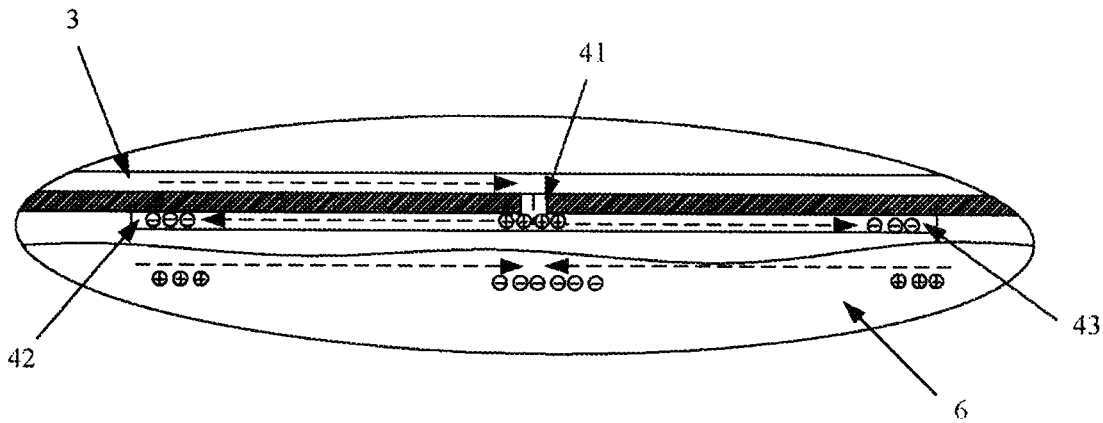
FIG. 4 is a principle diagram of formation of an induced current on a body surface in a case that a wireless terminal is close to a body according to an embodiment of this application.

FIG. 4 illustrates a principle for a case that the induced current on the body skin 6 flows toward a position close to the connection stub 41. When the current on the connection stub 41 flows to the first stub 42, positive charges are gathered at a position of the connection stub 41, and negative charges are gathered at an end that is of the first stub 42 and that is away from the connection stub 41 (that is, a tail end of the first stub). Therefore, positive charges are gathered at a position that is of the body skin 6 and that corresponds to the tail end of the first stub 42, and negative charges are gathered at a position that is of the body skin 6 and that corresponds to the connection stub 41.

Similarly, when the current on the connection stub 41 flows to the second stub 43, positive charges are gathered at a position of the connection stub 41, and negative charges are gathered at an end that is of the second stub 43 and that is away from the connection stub 41 (that is, a tail end of the second stub). Therefore, positive charges are gathered at a position that is of the body skin 6 and that corresponds to the tail end of the second stub 43, and negative charges are gathered at a position that is of the body skin 6 and that corresponds to the connection stub 41. In this case, there are induced currents with opposite directions on the body skin. In this way, at a position close to the connection stub, the induced currents with opposite directions cancel each other out, thereby reducing the induced currents on the body skin.

The following analyzes, by using a simulation experiment, the loss reduction effect of the loss reduction structure provided in embodiments of this application.

A simulation block with a length size of 80 mm, a width size of 80 mm and a height size of 50 mm is used. Parameters of the simulation block are the same as those of human tissue. In other words, the simulation block is used to simulate body skin.

Figure 5A:
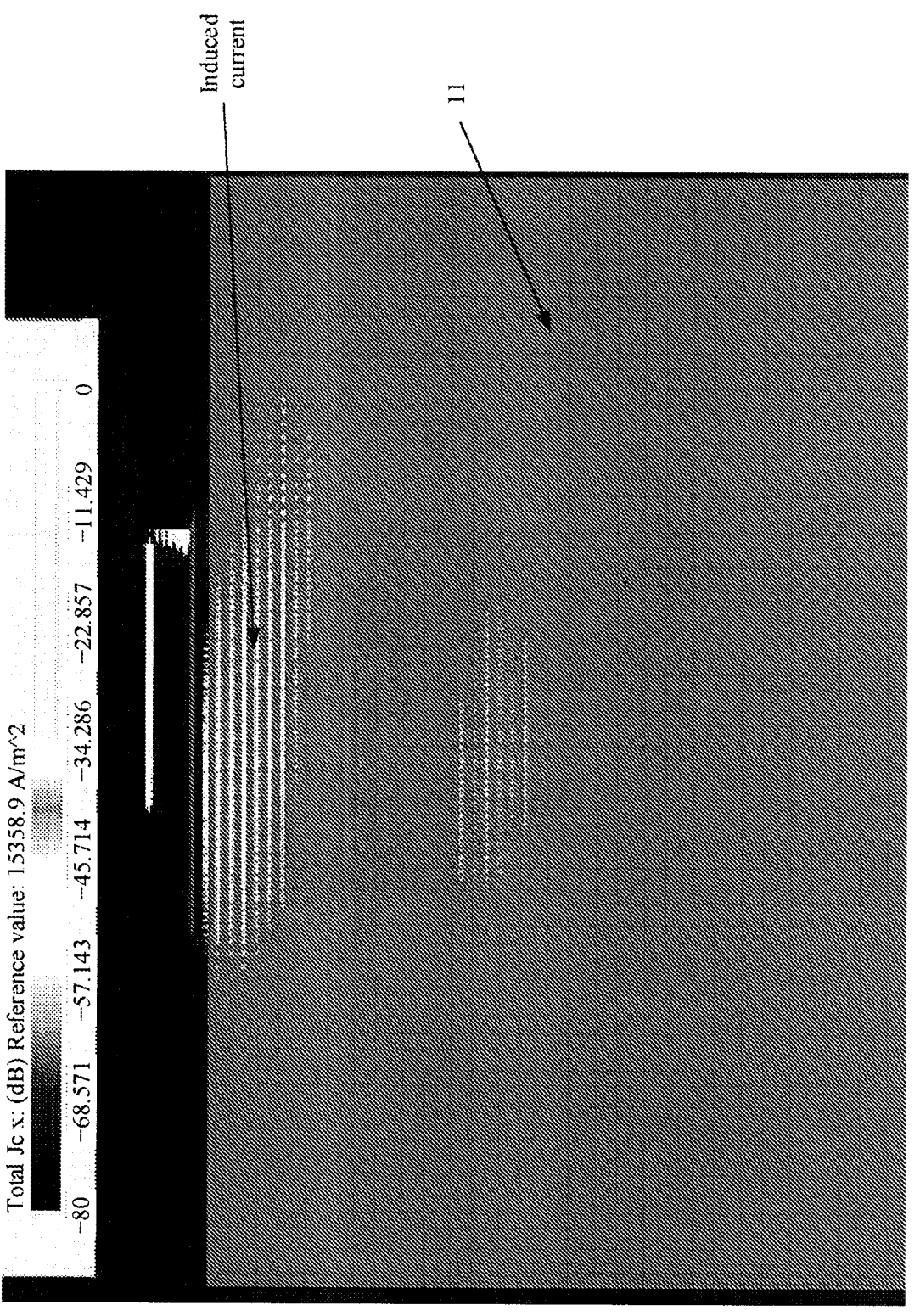
FIG. 5a is a diagram of a simulation effect of a wireless terminal according to an embodiment of this application.

FIG. 5*a* is a simulation diagram of an induced current on a simulation block 11 in a case that no loss reduction structure is disposed in a wireless terminal.

Figure 5B:
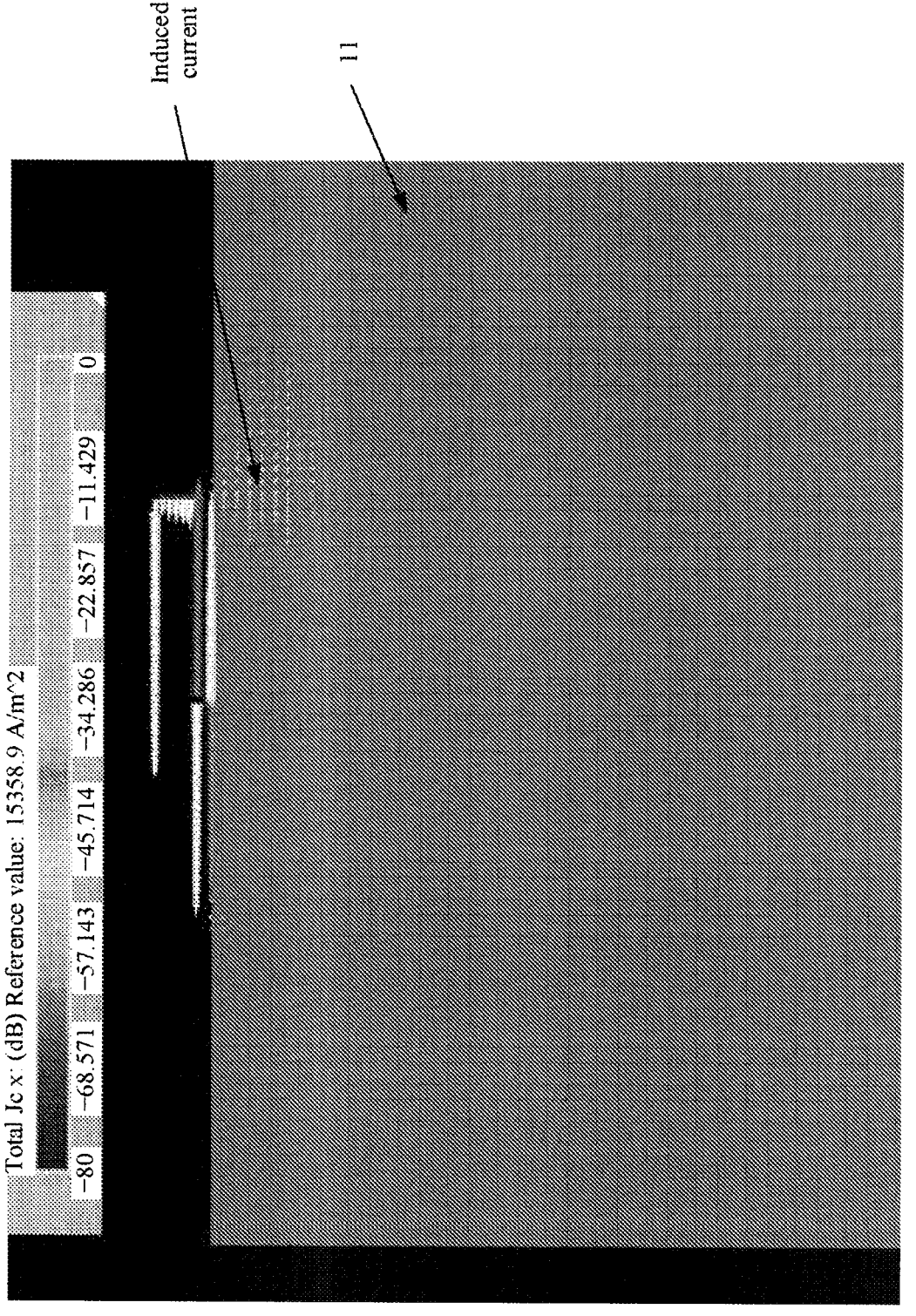
FIG. 5b is a diagram of a simulation effect of a wireless terminal according to an embodiment of this application.

FIG. 5*b* is a simulation diagram of an induced current on a simulation block 11 in a case that a loss reduction structure is disposed in a wireless terminal.

It can be obviously seen from FIG. 5*a* that there is a strong induced current on a surface that is of the simulation block 11 and that is close to the wireless terminal. However, it can be obviously seen from FIG. 5*b* that an induced current on a surface that is of the simulation block 11 and that is close to the wireless terminal is very weak. Therefore, when the wireless terminal has a loss reduction structure, the absorption of the electromagnetic wave of the antenna by the human body can be obviously reduced, thereby improving the radiation efficiency of the antenna.

Figure 6:
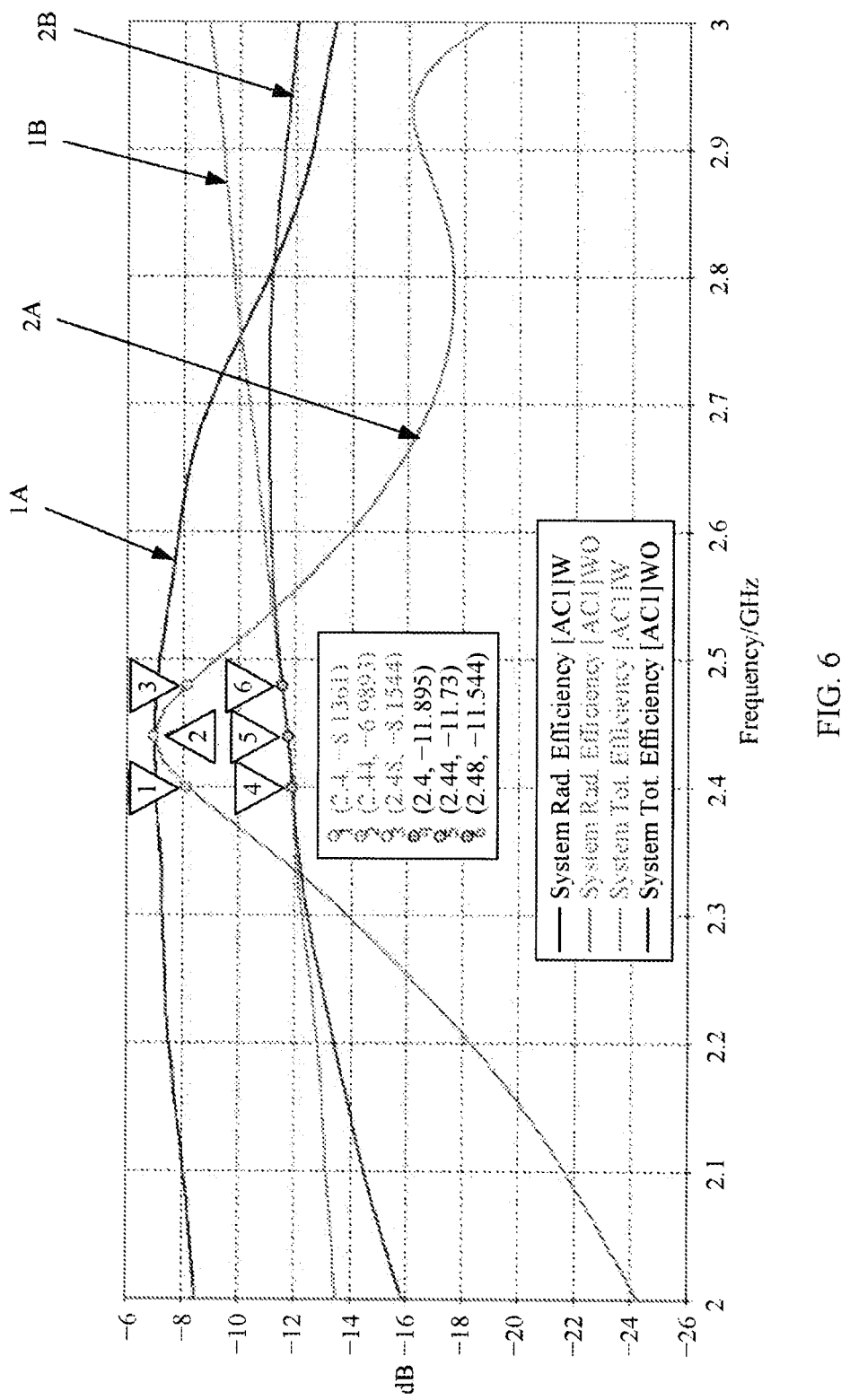
FIG. 6 is a curve graph of antenna radiation efficiency and system efficiency of a wireless terminal according to an embodiment of this application.

FIG. 6 is a curve graph of comparison of antenna radiation efficiency and system efficiency in a case that a wireless terminal is provided with no loss reduction structure with those in a case that the wireless terminal is provided with a loss reduction structure.

Curve 1A in FIG. 6 is a curve of antenna radiation efficiency in a case that a loss reduction structure is disposed. Curve 2A in FIG. 6 is a curve of system efficiency in a case that a loss reduction structure is disposed. Curve 1B in FIG. 6 is a curve of antenna radiation efficiency in a case that no loss reduction structure is disposed. Curve 2B in FIG. 6 is a curve of system efficiency in a case that no loss reduction structure is disposed.

It can be obviously seen from the four curves that both the antenna radiation efficiency and the system efficiency are improved by more than 3 dB after the loss reduction structure is disposed. Therefore, the wireless terminal including the loss reduction structure provided in embodiments of this application can effectively improve the antenna radiation efficiency and the system efficiency.

There are various cases for positions for disposing the first stub 42 and the second stub 43, and these cases are described below by using three embodiments.

Embodiment 1

As shown in FIG. 2, the first side plate 101 has a first wall surface A1 and a second wall surface A2 that are opposite each other. The first wall surface A1 faces the circuit board 3, and the second wall surface A2 faces away from the circuit board 3. The first stub 42 and the second stub 43 are located on the second wall surface A2.

In other words, the first stub 42 and the second stub 43 are located on an outer wall surface of the housing 1. A technical effect generated by such a design is: When the first side plate is close to the body skin, since the first stub and the second stub are disposed on the outer wall surface of the first side plate, the first stub and the second stub are relatively close to the body skin. In this case, the human body's absorption of the electromagnetic wave radiated by the antenna is reduced more significantly. In addition, since the loss reduction structure is also made of a metal material and can be used as an antenna radiator, disposing the first stub and the second stub on the outer wall surface of the housing can increase a clearance height of the antenna and improve the radiation efficiency of the antenna.

Embodiment 2

Figure 8:
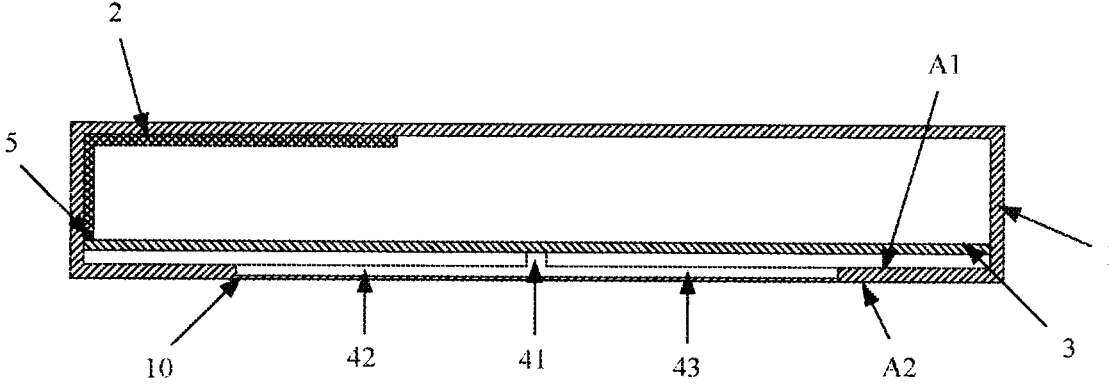
FIG. 8 is a schematic diagram of a structure of a wireless terminal according to an embodiment of this application.

As shown in FIG. 8, the first side plate 101 has a first wall surface A1 and a second wall surface A2 that are opposite each other. The first wall surface A1 faces the circuit board 3, and the second wall surface A2 faces away from the circuit board 3. The first wall surface A1 is provided with a groove 10, and the first stub 42 and the second stub 43 are located in the groove 10.

In other words, the first stub 42 and the second stub 43 are located on an inner wall surface of the housing 1. In this way, appearance aesthetics of the wireless terminal can be improved. In addition, compared with directly disposing the first stub and the second stub on the first wall surface, providing a groove on the first wall surface A1 and disposing the first stub 42 and the second stub 43 in the groove can reduce distances from the first stub and the second stub to the body skin. In this case, the human body's absorption of the electromagnetic wave radiated by the antenna is reduced more significantly. In addition, since the loss reduction structure is also made of a metal material and can be used as an antenna radiator, disposing the first stub and the second stub in the groove can increase a clearance height of the antenna and improve the radiation efficiency of the antenna.

Embodiment 3

The first stub 42 and the second stub 43 are located on a first wall surface A1.

When the first stub 42 and the second stub 43 are located on a second wall surface A2, the connection stub 41 can be implemented in a plurality of manners.

Figure 7:
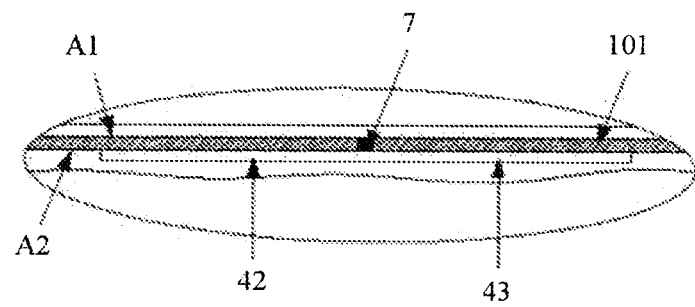
FIG. 7 is a schematic diagram of a partial structure of a wireless terminal according to an embodiment of this application.

For example, referring to FIG. 7, a metal through hole 7 is disposed on the first side plate 101. The metal through hole 7 penetrates the first wall surface A1 and the second wall surface A2, and forms the connection stub.

For another example, a through hole is disposed on the first side plate 101. The through hole penetrates the first wall surface A1 and the second wall surface A2. The connection stub is located in the through hole, and is a metal sheet.

In the first embodiment described above, forming the connection stub by using the metal through hole is simple in structure and is convenient for implementation. Therefore, forming the connection stub by using the metal through hole is preferred in this application.

Figure 9:
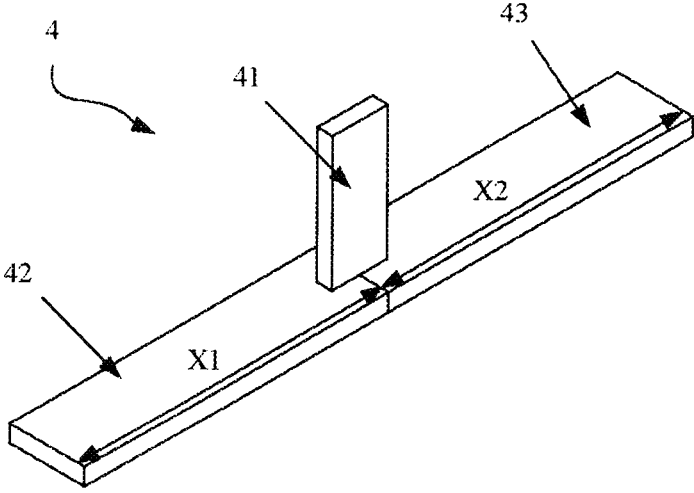
FIG. 9 is a schematic diagram of a structure of a loss reduction structure according to an embodiment of this application.

To further reduce the human body's absorption of the electromagnetic wave radiated by the antenna, referring to FIG. 9, the first stub 42 and the second stub 43 are symmetrically arranged with respect to the connection stub 41.

When the first stub 42 and the second stub 43 are symmetrically arranged with respect to the connection stub 41, a length size of the first stub 42 is equal to that of the second stub 43. To be specific, the length size X1 of the first stub 42 and the length size X2 of the second stub 43 shown in FIG. 9 are equal or nearly equal. In this case, a magnitude of the current on the first stub 42 is equal to that of the current on the second stub 43. Correspondingly, an induced current that is formed at a position on the body skin and that corresponds to the first stub is equal to an induced current that is formed at a position on the body surface and that corresponds to the second stub. In this case, the currents in the region that is of the body skin and that is close to the connection stub cancel each other out, and approximately completely cancel each other out. Therefore, the absorption of the electromagnetic wave of the antenna by the body surface is further reduced, and the radiation efficiency of the antenna is further improved.

To further reduce the human body's absorption of the electromagnetic wave radiated by the antenna, a sum of the length of the first stub 42 and the length of the second stub 43 is one half of a transmission wavelength of an electromagnetic wave on a frequency band of the antenna. Referring to FIG. 9, the sum of the length size X1 of the first stub 42 and the length size X2 of the second stub 43 is one half of the transmission wavelength of the electromagnetic wave on the frequency band of the antenna.

It should be noted that the transmission wavelength of the electromagnetic wave on the frequency band of the antenna refers to a propagation wavelength of the electromagnetic wave in a medium (for example, the human body).

In addition, it should be noted that, that the sum of the length of the first stub 42 and the length of the second stub 43 is approximately one half of the transmission wavelength of the electromagnetic wave on the frequency band of the antenna also falls within the protection scope of this application.

When the sum of the length of the first stub 42 and the length of the second stub 43 is one half of the transmission wavelength of the electromagnetic wave on the frequency band of the antenna, not only the currents in the region that is of the body skin and that is close to the connection stub approximately completely cancel each other out, but also a radiation effect of the antenna can be improved. The first stub and the second stub are also used as radiators of the antenna. Therefore, when a length of the radiator of the antenna is equal to or close to a quarter of the frequency band of the antenna, the radiation effect of the antenna can be improved.

The connection stub 41, the first stub 42, and the second stub 43 are made of metal materials. There are a plurality types of optional metal materials, such as copper, aluminum, and zinc. The materials of the connection stub, the first stub, and the second stub are not limited in this application.

In addition, when the first stub and the second stub are disposed on the second wall surface, the first stub and the second stub may be prepared by using the following manufacturing method.

In some implementations, the second wall surface is covered with a metal film layer, and then the first stub and the second stub are formed on the metal film layer. For example, the first stub and the second stub may be manufactured on the metal film layer by means of etching or laser engraving. For another example, the first stub and the second stub may be formed by means of exposure and development.

In some other implementations, stamping, screen printing, spraying, or exposure and development are performed on the second wall surface, to form the first stub and the second stub.

In addition, when the first stub and the second stub are disposed in the groove on the first wall surface, the first stub and the second stub may be prepared by using the following preparation method.

In some implementations, the groove is formed on the first wall surface through dry etching or wet etching; subsequently, the groove is covered with a metal film layer; and then the first stub and the second stub are formed on the metal film layer. For example, the first stub and the second stub may be manufactured on the metal film layer by means of etching or laser engraving. For another example, the first stub and the second stub may be formed by means of exposure and development.

In some other implementations, the groove is formed on the first wall surface through dry etching or wet etching; and stamping, screen printing, spraying, or exposure and development are performed in the groove, to form the first stub and the second stub.

There are various manners of electrically connecting the connection stub to the circuit board, and three embodiments are enumerated below.

Embodiment 1

The connection stub 41 is electrically connected to the circuit board 3 by using a capacitor. Because a high frequency current flows through the circuit board 3, the capacitor is an element that enables a high frequency to pass through but blocks a low frequency. Therefore, electrically connecting the connection stub 41 to the circuit board 3 by using the capacitor leads to a simple structure and small impedance of the entire loss reduction structure.

Embodiment 2

The connection stub 41 is electrically coupled to the circuit board 3. The electrical coupling is a non-contact electrical connection, leading to a simple structure and convenient implementation.

Embodiment 3

The connection stub 41 is connected to the circuit board 3 by using a welding structure.

Certainly, the connection stub 41 may alternatively be connected to the circuit board by using another electrical connection structure. A specific connection structure is not limited in this application.

Figure 10:
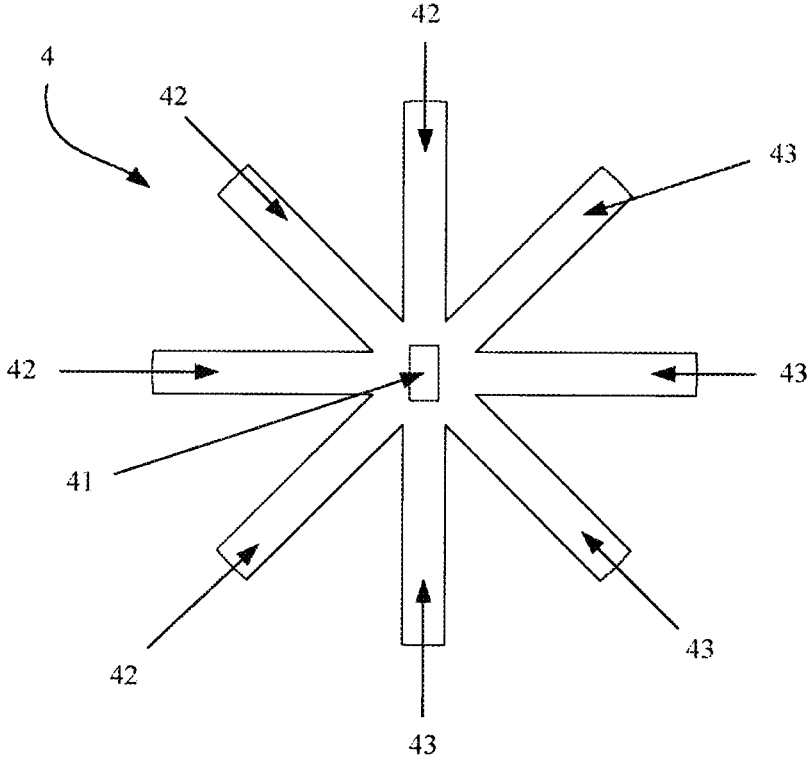
FIG. 10 is a schematic diagram of a structure of a loss reduction structure according to an embodiment of this application.

In some implementations, referring to FIG. 10, there are a plurality of first stubs 42 and a plurality of second stubs 43. The plurality of first stubs 42 and the plurality of second stubs 43 are in one-to-one correspondence. One of the first stub 42 and its corresponding second stub 43 are located on the two sides of the connection stub 41.

It should be noted that the one-to-one correspondence between the plurality of first stubs 42 and the plurality of second stubs 43 means: A quantity of the first stubs 42 is equal to that of the second stubs 43; and regarding arrangement positions, any first stub 42 and its corresponding second stub 43 are located on the two sides of the connection stub 41.

The loss reduction structure has a plurality groups of stubs, and each group of stubs includes a first stub and a second stub corresponding to the first stub. An advantage of disposing a plurality groups of stubs is: In some application scenarios, there is a relatively large contact area between the first side plate and the body skin. Therefore, disposing a plurality of first stubs and a plurality of second stubs can avoid a phenomenon that a part of the surface of the body skin has a relatively large induced current and a part of the surface of the body skin has a relatively small induced current. Therefore, by disposing a plurality groups of stubs, the induced current on the surface of the body skin is further reduced, thereby further improving the radiation efficiency of the antenna.

There are two manners of arranging the plurality groups of stubs, and these manners are explained separately below.

First: Referring to FIG. 10, there is a spacing between every two adjacent stubs. In other words, every two adjacent stubs are separated.

Figure 11:
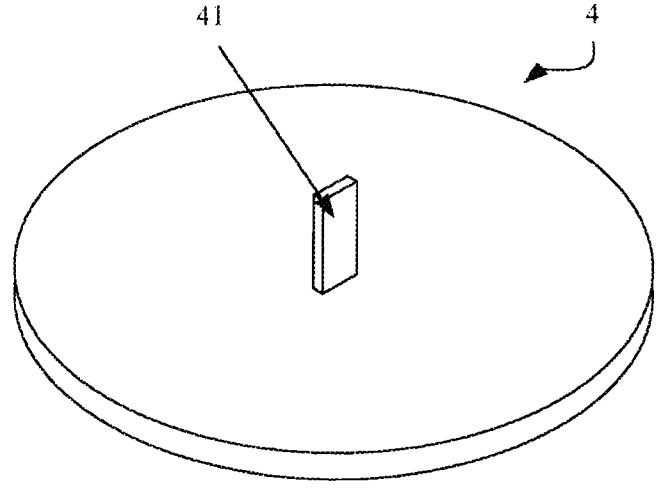
FIG. 11 is a schematic diagram of a structure of a loss reduction structure according to an embodiment of this application.

Second: Referring to FIG. 11, every two adjacent stubs are connected into a whole. In this way, all the stubs are connected into a whole, to form a pivotable structure with the connection stub 41 as a center.

Figure 12:
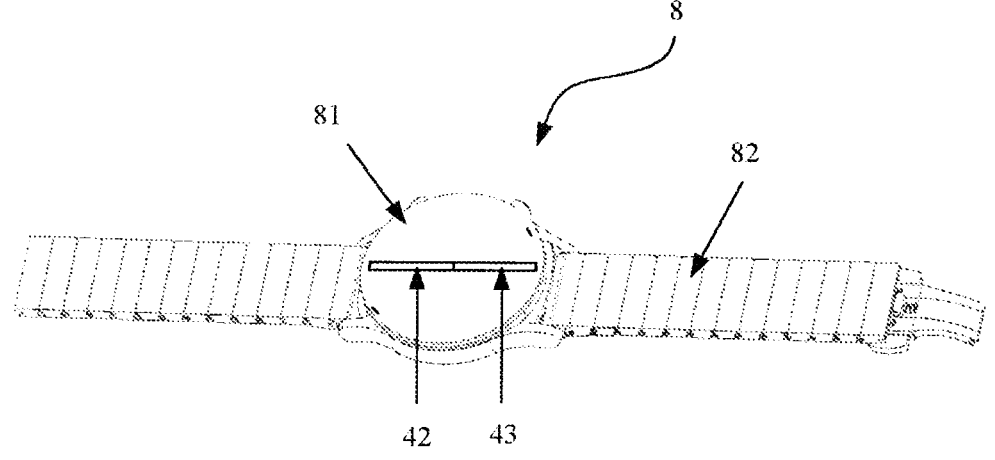
FIG. 12 is a schematic diagram of a structure of a wireless terminal being a wearable device according to an embodiment of this application.

In the second arrangement manner, when the wireless terminal is a wearable device, for example, when the wireless terminal is a watch or a smart band, referring to FIG. 12, the watch 8 or the smart hand includes a watch body 81 and a watch band 82.

Figure 13:
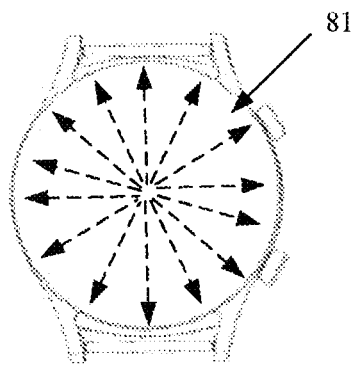
FIG. 13 is a schematic diagram of a structure of a watch body of a wearable device according to an embodiment of this application.

Referring to FIG. 13, the first side plate is a bottom cover plate of the watch body. The first side plate is in a pivotable structure, and is made of a metal material. A position at which the connection stub and the first side plate are connected is located at a center of the first side plate. The first side plate forms the first stub and the second stub. In other words, the bottom cover plate of the watch body is directly used as the first stub and the second stub. In this way, compared with disposing a separate loss reduction structure, an entire structure of the watch can be simplified.

A dashed line with an arrow in FIG. 13 represents a flow direction of a high frequency current on the bottom cover plate in a case that the bottom cover plate of the watch body serves as the first stub and the second stub, and the antenna transmits or receives a signal.

As shown in FIG. 12, the first stub 42 and the second stub 43 are disposed on the bottom cover plate of the watch body 81. In other words, the bottom cover plate is not used as the first stub and the second stub. This solution also falls within the protection scope of this application.

Figure 14:
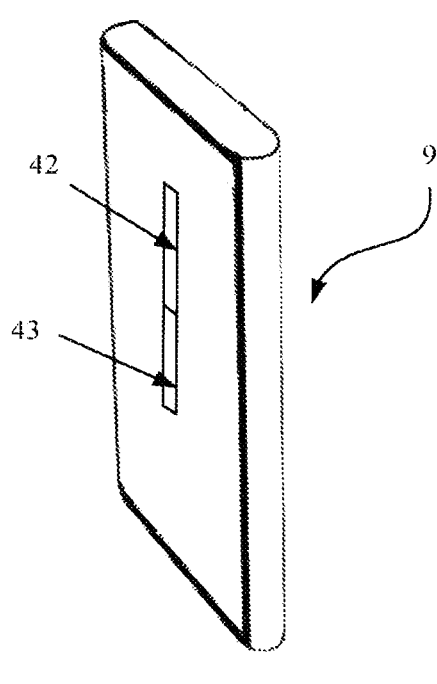
FIG. 14 is a schematic diagram of a structure of a wireless terminal being a mobile phone according to an embodiment of this application.

As shown in FIG. 14, the wireless terminal is a mobile phone 9, and the first stub 42 and the second stub 43 are disposed on a rear cover plate of the mobile phone 9. In the descriptions of this specification, the specific features, structures, materials, or characteristics may be combined in a proper manner in any one or more of embodiments or examples.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless terminal comprising:
a housing comprising a first side plate;
an antenna disposed in the housing;
a circuit board disposed in the housing, proximate to the first side plate and facing the first side plate, wherein the circuit board is a ground end of the antenna;
a loss reduction structure comprising a metal material and further comprising:
a connection stub coupled to the circuit board;

a first stub coupled to the connection stub and proximate to the first side plate;
a second stub coupled to the connection stub and proximate to the first side plate;
a third stub coupled to the connection stub and proximate to the first side plate;
a fourth stub coupled to the connection stub and proximate to the first side plate;
a fifth stub coupled to the connection stub and proximate to the first side plate;
a sixth stub coupled to the connection stub and proximate to the first side plate;
a seventh stub coupled to the connection stub and proximate to the first side plate; and
an eighth stub coupled to the connection stub and proximate to the first side plate,
wherein the first stub, the second stub, the third stub, the fourth stub, the fifth stub, the sixth stub, the seventh stub, and the eighth stub are arranged in a direction parallel to the first side plate, and
wherein the first stub, the second stub, the third stub, the fourth stub, the fifth stub, the sixth stub, the seventh stub, and the eighth stub are equally spaced and extend radially from the connection stub; and
a capacitor or a non-contact electrical connection coupled between the connection stub and the circuit board.

2. The wireless terminal of claim 1, wherein the first stub, the second stub, the third stub, the fourth stub, the fifth stub, the sixth stub, the seventh stub, and the eighth stub are symmetrically arranged with respect to the connection stub.

3. The wireless terminal of claim 1, wherein a sum of a first length of the first stub and a second length of the second stub is one half of a transmission wavelength of an electromagnetic wave on a frequency band of the antenna.

4. The wireless terminal of claim 3, wherein the first length is equal to the second length.

5. The wireless terminal of claim 1, wherein the first side plate comprises:
a first wall surface facing the circuit board; and
a second wall surface located opposite to the first wall surface and facing away from the circuit board, wherein the first stub and the second stub are located on the second wall surface.

6. The wireless terminal of claim 5, further comprising a metal through hole disposed on the first side plate, penetrating the first wall surface and the second wall surface, and defining the connection stub.

7. The wireless terminal of claim 1, wherein the first side plate comprises:
a first wall surface facing the circuit board and comprising a groove, wherein the first stub and the second stub are located in the groove; and
a second wall surface located opposite to the first wall surface and facing away from the circuit board.

8. The wireless terminal of claim 1, wherein the first stub, the second stub, the third stub, the fourth stub, the fifth stub, the sixth stub, the seventh stub, and the eighth stub are coupled to form a pivotable structure with the connection stub as a center pivot point.

9. The wireless terminal of claim 1, wherein the wireless terminal is a wearable device, and wherein the wearable device comprises a watch body comprising a bottom cover plate, wherein the first stub and the second stub are disposed on the bottom cover plate.

10. The wireless terminal of claim 9, wherein the bottom cover plate comprises a metal pivotable structure defining the first stub and the second stub, and wherein a center of the bottom cover plate is coupled to the connection stub.

11. The wireless terminal of claim 1, wherein the wireless terminal is a mobile phone, wherein the mobile phone comprises a rear cover plate, and wherein the first stub and the second stub are disposed on the rear cover plate.

12. The wireless terminal of claim 1, further comprising a weld coupling the connection stub to the circuit board.

13. The wireless terminal of claim 1, wherein the first and the second stub define a triangular space.

14. The wireless terminal of claim 1, wherein the metal material is copper, aluminum, or zinc.

15. An apparatus comprising:

a side plate;

an antenna;

a circuit board, wherein the circuit board is a ground end of the antenna;

a connection stub coupled to the circuit board;

a first stub coupled to the connection stub and proximate to the side plate;

a second stub coupled to the connection stub and proximate to the side plate;

a third stub coupled to the connection stub and proximate to the side plate;

a fourth stub coupled to the connection stub and proximate to the side plate;

a fifth stub coupled to the connection stub and proximate to the side plate;

a sixth stub coupled to the connection stub and proximate to the side plate;

a seventh stub coupled to the connection stub and proximate to the side plate; and an eighth stub coupled to the connection stub and proximate to the side plate, wherein the first stub, the second stub, the third stub, the fourth stub, the fifth stub, the sixth stub, the seventh stub, and the eighth stub are parallel to the side plate, wherein the first stub, the second stub, the third stub, the fourth stub, the fifth stub, the sixth stub, the seventh stub, and the eighth stub are equally spaced and extend radially from the connection stub, and wherein a sum of a first length of the first stub and a second length of the second stub is one half of a transmission wavelength of an electromagnetic wave in a frequency band of the antenna.

16. The apparatus of claim 15, wherein the connection stub is further coupled to the circuit board by a capacitor, a non-contact electrical connection, or a weld.

17. An apparatus comprising:

a side plate;

an antenna;

a circuit board, wherein the circuit board is a ground end of the antenna; and a loss reduction structure comprising:

a connection stub coupled to the circuit board;

a first stub coupled to the connection stub and proximate to the side plate;

a second stub coupled to the connection stub and proximate to the side plate;

a third stub coupled to the connection stub and proximate to the side plate;

a fourth stub coupled to the connection stub and proximate to the side plate;

a fifth stub coupled to the connection stub and proximate to the side plate;

a sixth stub coupled to the connection stub and proximate to the side plate;

a seventh stub coupled to the connection stub and proximate to the side plate; and an eighth stub coupled to the connection stub and proximate to the side plate, wherein the loss reduction structure is rotationally symmetric about the connection stub, and wherein a sum of a first length of the first stub and a second length of the second stub is one half of a transmission wavelength of an electromagnetic wave in a frequency band of the antenna.

18. The apparatus of claim 17, further comprising a non-contact electrical connection coupled between the connection stub and the circuit board.

19. The apparatus of claim 17, wherein the side plate comprises:

a first wall surface facing the circuit board; and a second wall surface located opposite to the first wall surface and facing away from the circuit board, wherein the first stub and the second stub are located on the second wall surface.

20. The apparatus of claim 19, further comprising a metal through hole disposed on the side plate, penetrating the first wall surface and the second wall surface, and defining the connection stub.

* * * * *